US012619769B2

(12) United States Patent
Moore et al.

(10) Patent No.: US 12,619,769 B2
(45) Date of Patent: May 5, 2026

(54) DATA SECURITY IN COMMUNICATIONS

(71) Applicant: Ford Global Technologies, LLC,
Dearborn, MI (US)

(72) Inventors: John Moore, Canton, MI (US);
Bradley Warren Smith, Ann Arbor, MI
(US); Elizabeth Kanous, Southfield,
MI (US); Dajiang Suo, Cambridge, MA
(US); Sanjay Emani Sarma,
Lexington, MA (US)

(73) Assignee: Ford Global Technologies, LLC,
Dearborn, MI (US)

( * ) Notice: Subject to any disclaimer, the term of this
patent is extended or adjusted under 35
U.S.C. 154(b) by 334 days.

(21) Appl. No.: 18/187,114

(22) Filed: Mar. 21, 2023

(65) Prior Publication Data
US 2024/0320363 A1 Sep. 26, 2024

(51) Int. Cl.
*G06F 21/62* (2013.01)
*H04L 9/08* (2006.01)
*H04L 9/40* (2022.01)
*H04L 67/12* (2022.01)
*H04W 12/02* (2009.01)

(52) U.S. Cl.
CPC ........ *G06F 21/6245* (2013.01); *H04W 12/02*
(2013.01)

(58) Field of Classification Search
CPC ..... H04L 9/0819; H04L 9/40; H04L 63/0428;
H04L 67/12; G06F 21/6245; H04W 12/02
See application file for complete search history.

(56) References Cited

U.S. PATENT DOCUMENTS

| | | | |
|---|---|---|---|
| 7,519,823 B1 * | 4/2009 | Schumacher | G06F 21/76 |
| | | | 713/168 |
| 7,818,588 B2 | 10/2010 | Duri et al. | |
| 8,315,786 B2 | 11/2012 | Horvitz et al. | |
| 8,327,451 B2 | 12/2012 | Duri et al. | |
| 8,538,624 B2 | 9/2013 | Lindinger et al. | |
| 9,356,742 B2 | 5/2016 | Menzel et al. | |
| 9,953,467 B2 | 4/2018 | Smith et al. | |
| 10,395,515 B2 | 8/2019 | Wouhaybi et al. | |
| 10,491,575 B2 | 11/2019 | Verzun et al. | |
| 10,542,118 B2 | 1/2020 | Ekstrom et al. | |

(Continued)

FOREIGN PATENT DOCUMENTS

WO 2019133048 A1 7/2019

OTHER PUBLICATIONS

Allig et al., "Trustworthiness Estimation of Entities within Collective Perception", 2019 IEEE Vehicular Networking Conference (VNC), Dec. 4-6, 2019, DOI: 10.1109/VNC48660.2019.9062796.
Ansari et al., "V2X Misbehavior and Collective Perception Service: Considerations for Standardization", Dec. 3, 2021, https://arxiv.org/ftp/arxiv/papers/2112/2112.02184.pdf.
Bian et al., "Toward Secure Crowd Sensing in Vehicle-to-Everything Networks", IEEE Network (vol. 32, Iss. 2, Mar.-Apr. 2018); DOI: 10.1109/MNET.2017.1700098.

(Continued)

*Primary Examiner* — Andrew Suh
(74) *Attorney, Agent, or Firm* — Christopher Storms;
Brooks Kushman P.C.

(57) ABSTRACT

A computer includes a processor and a memory, the memory stores instructions executable by the processor to generate obscured received data from received data by applying at least one Boolean operation to the data and to transmit, via a first communications channel, the obscured received data to a second computer. The executable instructions are additionally to transmit, via a second communications channel, a key to the second computer.

20 Claims, 7 Drawing Sheets

(56)　　　　References Cited

U.S. PATENT DOCUMENTS

| | | | |
|---|---|---|---|
| 10,748,295 B2 * | 8/2020 | Rogan | B60D 1/06 |
| 10,796,501 B2 | 10/2020 | Cheng et al. | |
| 11,153,721 B2 | 10/2021 | Graefe et al. | |
| 2019/0256091 A1 * | 8/2019 | Lepp | G08G 1/143 |
| 2019/0370569 A1 | 12/2019 | Gulati et al. | |
| 2020/0068379 A1 * | 2/2020 | Martin | H04W 72/23 |
| 2020/0137536 A1 | 4/2020 | Nguyen et al. | |
| 2021/0064344 A1 * | 3/2021 | Johnson | G06F 7/584 |
| 2022/0159468 A1 * | 5/2022 | Prutchi | H04B 5/45 |
| 2022/0402501 A1 * | 12/2022 | Klomp | B60D 1/62 |
| 2023/0334177 A1 * | 10/2023 | Robinson | H04L 63/0428 |
| 2023/0396416 A1 * | 12/2023 | Myers | H04L 9/14 |
| 2024/0124028 A1 * | 4/2024 | Djuric | B60W 60/0027 |

OTHER PUBLICATIONS

Hadded et al., "Security attacks impact for collective perception based roadside assistance: A study of a highway on-ramp merging case", 2020 International Wireless Communications and Mobile Computer (IWCMC), Jun. 15-19, 2020, DO.1009/IWCMC48107. 2020.9148235.

Yang et al., "MISO-V: Misbehavior Detection for Collective Perception Services in Vehicular Communications", 2021 EEE Intelligent Vehicles Symposium (IV), Jul. 11-17, 2021, DOI: 10.1109/IV48863.2021.9575970.

Tsukada et al., "Misbehavior Detection Using Collective Perception under Privacy Considerations", arXiv:2111.03461v1 [cs.CR] Nov. 2, 2021.

* cited by examiner

500

DATA SECURITY IN COMMUNICATIONS

BACKGROUND

A wide variety of architectures and environments can utilize communications links to transmit sensitive and/or important data. For example, a communications link utilized to conduct communications among vehicles, as well as communications links utilized in the transmission of numerous other types of data, may benefit from securable so as to maintain the security of the communications channel. For example, vehicles can include a variety of sensors, such as sensors that can provide data to detect and classify objects located in a vehicle environment. It may be useful, for example, for a first vehicle to cooperatively transmit data to second vehicle, e.g., data about of the detected object can be received at a second vehicle so that the second vehicle can utilize the data detected obtained about the object in the first vehicle.

DETAILED DESCRIPTION

Figure 1:
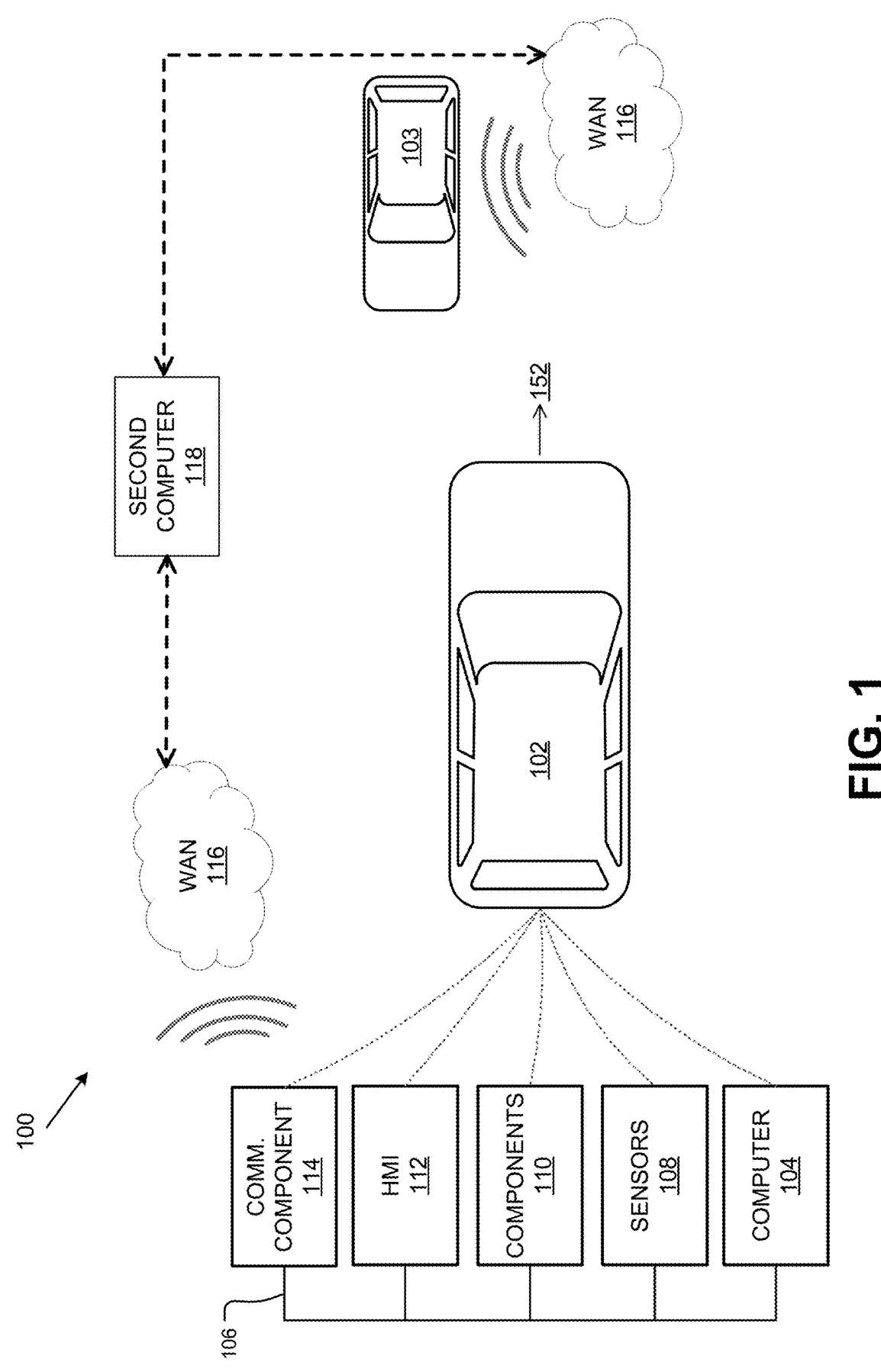
FIG. 1 is a block diagram of an example first vehicle in communication with a second vehicle via an intervening network.

This disclosure provides techniques for providing security of data generated by an onboard vehicle sensor. Examples of data generated by an onboard vehicle sensor may include objects detected and/or classified via radar sensors, ultrasonic sensors, cameras, LIDAR devices, etc. Data generated by an onboard vehicle sensor may be useful to other vehicles in traffic, such as to provide notification of a detected object that may not yet be visible or may be shielded from other vehicles. For example, responsive to a first vehicle determining that a pedestrian is present and may encroach upon the vehicle's path, the first vehicle may cooperatively notify other vehicles, such as vehicles located to the sides or to the rear of the first vehicle, of the presence of the pedestrian. Such cooperative notification from a first vehicle to a second vehicle in a localized driving environment may be achieved through the use of a communications link between vehicles in the localized driving environment. Accordingly, other vehicles in the driving environment of the first vehicle may be made aware of the pedestrian's location and, if necessary, perform appropriate vehicle control functions. To preclude insertion of undesired or unwanted data into a communications link between vehicles in a localized driving environment, data may be obscured or encrypted prior to transmission by the first vehicle. A data obscuration or encryption process may be reversed at a second computer, e.g., a server located in the cloud, at a receiving vehicle, etc. Such obscuration of transmitted vehicle data may enhance confidence that data received at other vehicles in a localized driving environment faithfully and accurately reports objects detected and/or classified by onboard sensors of a first vehicle.

A system can comprise a computer including a processor coupled to a memory, the memory storing instructions including instructions executable by the processor to generate obscured received data from received data by applying at least one Boolean operation to the data and a key, to transmit, via a first communications channel, the obscured data to a second computer and to transmit, via a second communications channel, the key to the second computer to reverse obscuration of the obscured data.

The second computer that can include a second processor coupled to a second memory, the second memory to store second instructions to include instructions executable by the second processor to apply a Boolean operation to the key and the obscured data to reverse obscuration of the obscured data.

The Boolean operation can be one of a plurality of Boolean operations and the data can be obscured by a balanced obscuration process that preserves information content of data words of the data responsive to successive ones of the Boolean operations that utilize the data words and the key as inputs to the successive Boolean operations.

The instructions can further include instructions to insert an unused bit into the obscured data after generating the obscured data.

The instructions can further include instructions to insert an unused bit into a data word of the obscured data according to a rule to indicate the position of the unused bit of the data word.

The instructions to generate the obscured data can include instructions to change a value of a portion of the obscured data based on a relationship between the portion and a portion of the key.

The instructions to generate the obscured data can include instructions to change a value of a portion of a data word of the obscured data based on a relationship between the value of the portion of the obscured data word and the value of a corresponding portion of the key.

The instructions to generate the obscured data can include instructions to change a value of a portion of a data word of the data based on whether the value of the portion of the data word is equal to a value at the corresponding location of the key.

The instructions to generate the obscured data can include instructions to apply an exclusive Boolean OR operator to the data.

The instructions to generate the obscured data comprise instructions to apply a Boolean NOT operator to the data.

The instructions to generate the obscured data comprise instructions to apply a dynamically selectable number of successive exclusive Boolean OR operations to the data.

The instructions to generate the obscured data comprise instructions to apply a dynamically selectable number of successive exclusive OR operators and a dynamically selectable number of successive NOT operators to the data.

The instructions to generate the obscured data can include instructions to apply a dynamically selectable random number of exclusive OR operators and a dynamically selectable random number of NOT operators to the data.

The first communications channel and the second communications channel can include wireless channels having addresses that differ from each other.

A method may include generating obscured received data from received data by applying at least one Boolean operation to the data and a key.

The method can include transmitting, via a first communications channel, the obscured data to a second computer and transmitting, via a second communications channel, a key to the second computer to reverse obscuration of the obscured data.

Generating obscured received data can include a balanced obscuration process, can include preserving information content of data words of the data responsive to successive Boolean operations that utilize the data words and the key as inputs to the successive Boolean operations.

The method can further include inserting an unused bit into the obscured data after generating the obscured data according to a rule to indicate the position of the unused bit of the data.

The method can further include changing a value of a portion of a data word of the obscured data based on whether the value of the portion of the data word is equal to a value at the corresponding location of the key.

Generating obscured received data can include applying, under the direction of a computer, a dynamically selectable number of successive exclusive Boolean OR operators to the data.

Generating obscured received data can include comprises applying a dynamically selectable random number of successive exclusive OR operators and a dynamically selectable random number of successive NOT operators to the data.

FIG. 1 is a block diagram of an example first vehicle in communication with a second vehicle via an intervening network. As seen in FIG. 1, system 100 includes first vehicle 102, which includes computer 104 that is communicatively coupled via an internal communication network, such as vehicle network 106, with various elements including sensors 108, subsystems or components 110 such as steering, propulsion, and braking, human machine interface (HMI) 112, and communication component 114. First vehicle 102 may be located in a traffic environment that includes other vehicles, such as second vehicle 103. First vehicle 102 and second vehicle 103 may communicate cooperatively, as described further herein, which permits first vehicle 102 and second vehicle 103 to share locally generated data, e.g., sensor data. Accordingly, in an example, parameters of objects detected and/or classified at first vehicle 102, e.g., in path 152 of first vehicle 102, may be cooperatively transmitted, e.g., by way of an intervening communications network, and received by second vehicle 103.

First vehicle 102 may include vehicle computer 104, which includes a processor and a memory. A memory of computer 104, such as those described herein, includes one or more forms of computer-readable media, and stores instructions executable by vehicle computer 104 for performing various operations, such that the vehicle computer is configured to perform the various operations, including those disclosed herein.

For example, vehicle computer 104 can be a generic computer with a processor and memory as described above and/or may include an electronic control unit (ECU) or controller for a specific function or set of functions, and/or may include a dedicated electronic circuit including an ASIC (application specific integrated circuit) that is manufactured for a particular operation, e.g., an ASIC for processing data from sensors 108 and/or communicating data from sensors 108. In another example, vehicle computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in computer 104. Further, vehicle computer 104 could include a plurality of computers 104 onboard vehicle 102, e.g., a plurality of ECUs (electronic control units) or the like, operating together to perform operations ascribed herein to vehicle computer 104.

The memory can be of any type, e.g., hard disk drives, solid state drives, servers, or any volatile or non-volatile media. The memory can store the collected data sent from sensors 108. The memory can be a separate device from computer 104, and computer 104 can retrieve information stored by the memory via a communication network in the vehicle such as vehicle network 106, e.g., over a CAN bus, a wireless network, etc. Alternatively or additionally, the memory can be part of computer 104, e.g., as a memory of computer 104.

Computer 104 can include programming in the form of executable instructions, which operate one or more components 110 such as vehicle brakes, propulsion (e.g., one or more of an internal combustion engine, electric motor, hybrid engine, etc.), steering, climate control, interior and/or exterior lights, etc., as well as to determine whether and when computer 104, as opposed to a human operator, is to control such operations. Additionally, computer 104 may be programmed to determine whether and when a human operator is to control such operations. Computer 104 may include or be communicatively coupled to, e.g., via vehicle network 106, such as a communications bus as described further below, more than one processor, e.g., included in components 110 such as sensors 108, electronic control units (ECUs) or the like included in the vehicle for monitoring and/or controlling various vehicle components, e.g., a powertrain controller, a brake controller, a steering controller, etc.

Computer 104 is generally arranged for communications on vehicle network 106, which can include a communications bus in the vehicle, such as a controller area network CAN or the like, and/or other wired and/or wireless mechanisms. Vehicle network 106 is a communications network via which messages can be exchanged between various devices, e.g., sensors 108, components 110, computer 104 (s), etc., onboard vehicle 102. Computer 104 can be generally programmed to send and/or receive, via vehicle network 106, messages to and/or from other devices in vehicle, e.g., any or all of ECUs, sensors 108, actuators, components 110, communications component 114, human machine interface (HMI) 112, etc. For example, various component 110 subsystems (e.g., components 110 can be controlled by respective ECUs) and/or sensors 108 may provide data to computer 104 via vehicle network 106. In turn, data from sensors 108 can be processed by computer 104 can be communicated to second computer 118, which is remote from the vehicle, such as a computer in another vehicle 103 and/or a server by way of intervening wireless area network (WAN) 116.

Second computer 118 may be a computer server, or network of computer servers, e.g., accessible to vehicles 102, 103 via network 116. For example, first vehicle 102 may communicate with second computer 118 utilizing a communications protocol such as mentioned below, which facilitates communications between vehicles and remote computing entities, e.g., via wide area network 116 or the like. In an example, such as described in reference to FIG. 4, second computer 118 may operate to convert obscured data from vehicle 102 to plaintext data via reversing the obscuring operations performed by computer 104. Second computer 118 can alternatively or additionally perform operations to obscure processed and/or augmented plaintext data for transmission or retransmission to a vehicle 102, 103, which may reverse the obscuration process so that plaintext data can be utilized in the vehicle 102, 103.

Alternatively or additionally, obscured data transmitted from a first vehicle 102 can be received and processed by second vehicle 103, which can communicate with vehicle 102 via a vehicle communications protocol such as mentioned below. Second vehicle 103 may utilize programming to convert received and obscured data to plaintext data, such as described in reference to FIG. 4, for use within a computer of second vehicle 103. In this context, second vehicle 103 may, according to the present disclosure, convert obscured data transmitted by vehicle 102 to plaintext data.

Further, in examples in which computer 104 actually comprises a plurality of devices, vehicle network 106 may be utilized to conduct communications between devices represented as computer 104 in this disclosure. For example, vehicle network 106 can include a controller area network (CAN) in which messages are conveyed via a CAN bus, or a local interconnect network (LIN) in which messages are conveyed via a LIN bus. In some implementations, vehicle network 106 can include a network in which messages are conveyed using other wired communication technologies and/or wireless communication technologies, e.g., Ethernet, wireless fidelity (WiFi®), Bluetooth®, etc. Additional examples of protocols that may be used for communications over vehicle network 106 in some implementations include, without limitation, Media Oriented System Transport (MOST), Time-Triggered Protocol (TTP), and FlexRay. In some implementations, vehicle network 106 can represent a combination of multiple networks, possibly of different types, that support communications among devices in a vehicle.

Vehicle 102 typically includes a variety of sensors 108. Sensors 108 may correspond to a device(s) that can obtain one or more measurements of one or more physical phenomena. Some of sensors 108 may detect internal states of the vehicle, for example, wheel speed, wheel orientation, and engine and transmission variables. Some of sensors 108 may operate to detect the position or orientation of the vehicle utilizing, for example, global positioning system GPS sensors; accelerometers, such as piezo-electric or microelectromechanical systems (MEMS); gyroscopes, such as rate, ring laser, or fiber-optic gyroscopes; inertial measurements units (IMUs); and magnetometers. Some of sensors 108 may detect the external world, for example, radar sensors, scanning laser range finders, light detection and ranging (LIDAR) devices, and image processing sensors such as cameras. A LIDAR device operates to detect distances to objects by emitting laser pulses and measuring the time of flight for the pulse to travel to the object and back to the emitter.

Computer 104 may be configured for communicating through a wireless communication interface with second vehicle 103, e.g., via a vehicle-to-vehicle (V2V), a vehicle-to-infrastructure (V-to-I) communication, and/or a vehicle-to-everything (V2X) communication network (i.e., communications that can include V2V and V2I). Some of sensors 108 are communications devices, for example, vehicle-toinfrastructure V2I or V2V devices, which may operate via a wireless communications network. Communications component 114 may include elements for sending (i.e., transmitting) and receiving radio frequency (RF) communications, e.g., chips, antenna(s), transceiver(s), etc. Communications component 114 represents one or more mechanisms by which computer 104 of vehicle 102 may communicate with other vehicles, e.g., vehicle 103, and/or elements of a communications infrastructure and may be one or more of wireless communication mechanisms, including any desired combination of wireless and wired communication mechanisms and any desired network topology (or topologies when a plurality of communication mechanisms are utilized). Exemplary V2X communication protocols include cellular, IEEE 802.11, dedicated short-range communications (DSRC), and/or wide area networks (WAN), including the Internet, providing data communication services. DSRC may have one-way or two-way short-range to medium-range wireless communication channels. A V2X communication network may have multiple channels, each identified by an identifier, e.g., channel number.

Exemplary System Operations

Figure 2:
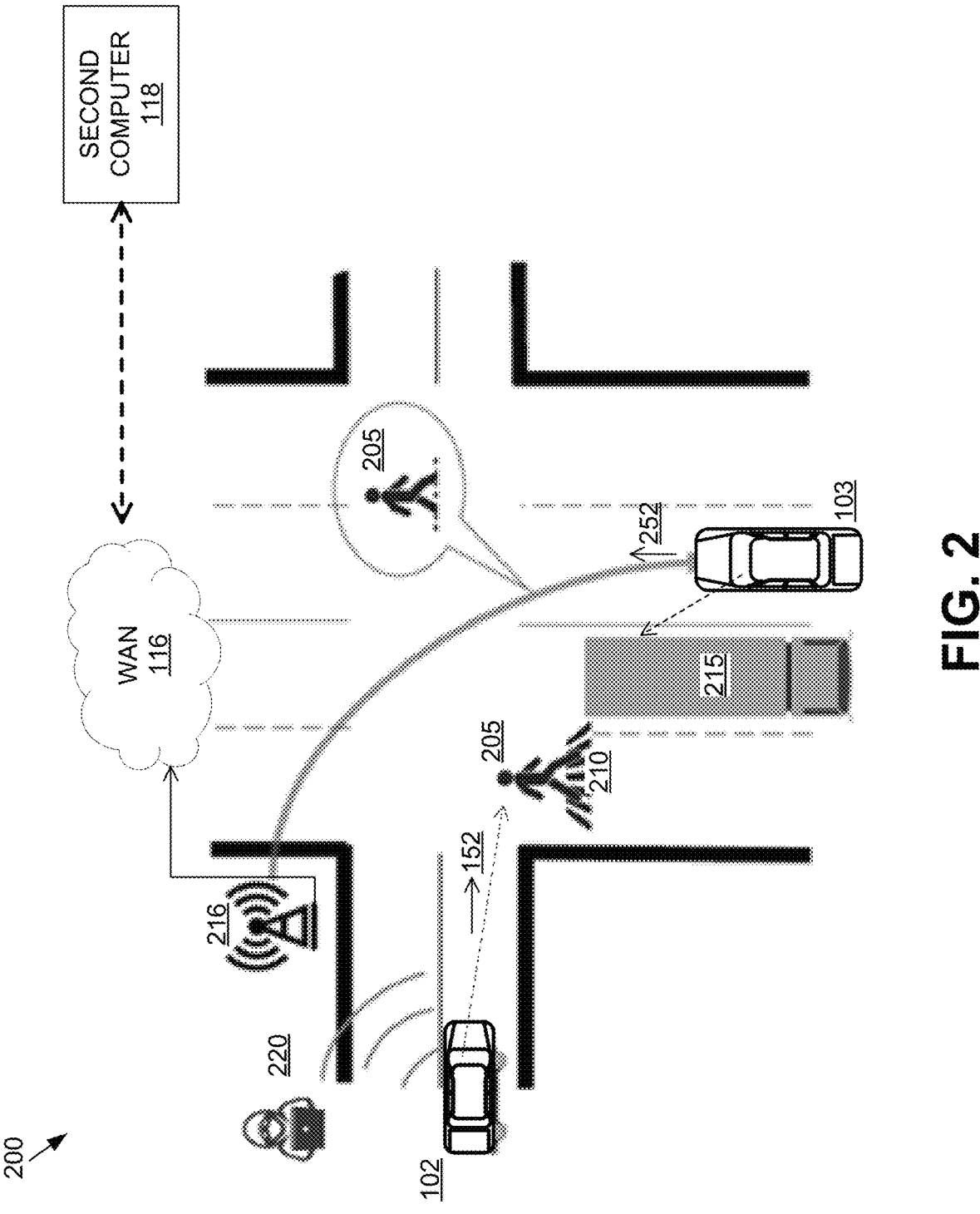
FIG. 2 is a diagram of an example first vehicle cooperatively communicating detected object parameters to a second vehicle.

FIG. 2 is a diagram of a first vehicle cooperatively communicating detected object parameters to a second vehicle. As seen in the diagram of FIG. 2, first vehicle 102 is shown proceeding along path 152 and approaching an intersection while second vehicle 103 approaches the same intersection from a different direction, such as along path 252. First vehicle 102 may utilize sensors 108 to detect and/or classify an object, such as pedestrian 205 within crosswalk 210. However, as also seen in FIG. 2, obstacle 215, which may include a truck, cargo van, or any other vehicle, renders pedestrian 205 as not visible or only partially visible to second vehicle 103. Thus, a driver of second vehicle 103 may continue traveling along path 252 without being aware of the presence of pedestrian 205 within crosswalk 210.

Advantageously, however, in example embodiments, first vehicle 102 can detect and/or classify pedestrian 205 based on data, e.g., acquired by sensors 108, processed by computer 104, and transmitted by communications component 114 for reception by, for example, wireless access point 216. Wireless access point 216 may provide an entry point into wireless area network 116, which permits data acquired at first vehicle 102 to be transmitted to second computer 118. Second computer 118 may process acquired data so that various data can be made available to other vehicles operating within the driving environment of first vehicle 102. Thus, as shown in FIG. 2, parameters of pedestrian 205 within crosswalk 210 may be cooperatively transmitted to second vehicle 103 via wireless communications between wireless access point 216 and second vehicle 103. Accordingly, second vehicle 103 can gain an awareness of the presence of pedestrian 205 within crosswalk 210. Second vehicle 103 may then come to a halt, thereby permitting pedestrian 205 to traverse crosswalk 210.

However, as can also be seen in FIG. 2, eavesdropping party 220 may seek to monitor communications between or among vehicles in a localized driving environment. For example, eavesdropping party 220 may attempt monitor wireless communications channel between first vehicle 102 and wireless access point 216. Hence, as described herein, communications from first vehicle 102 to wireless access point 216 may be obscured, so as to preclude eavesdropping party 220 from monitoring a communications channel between first vehicle 102 and wireless access point 216.

Figure 3:
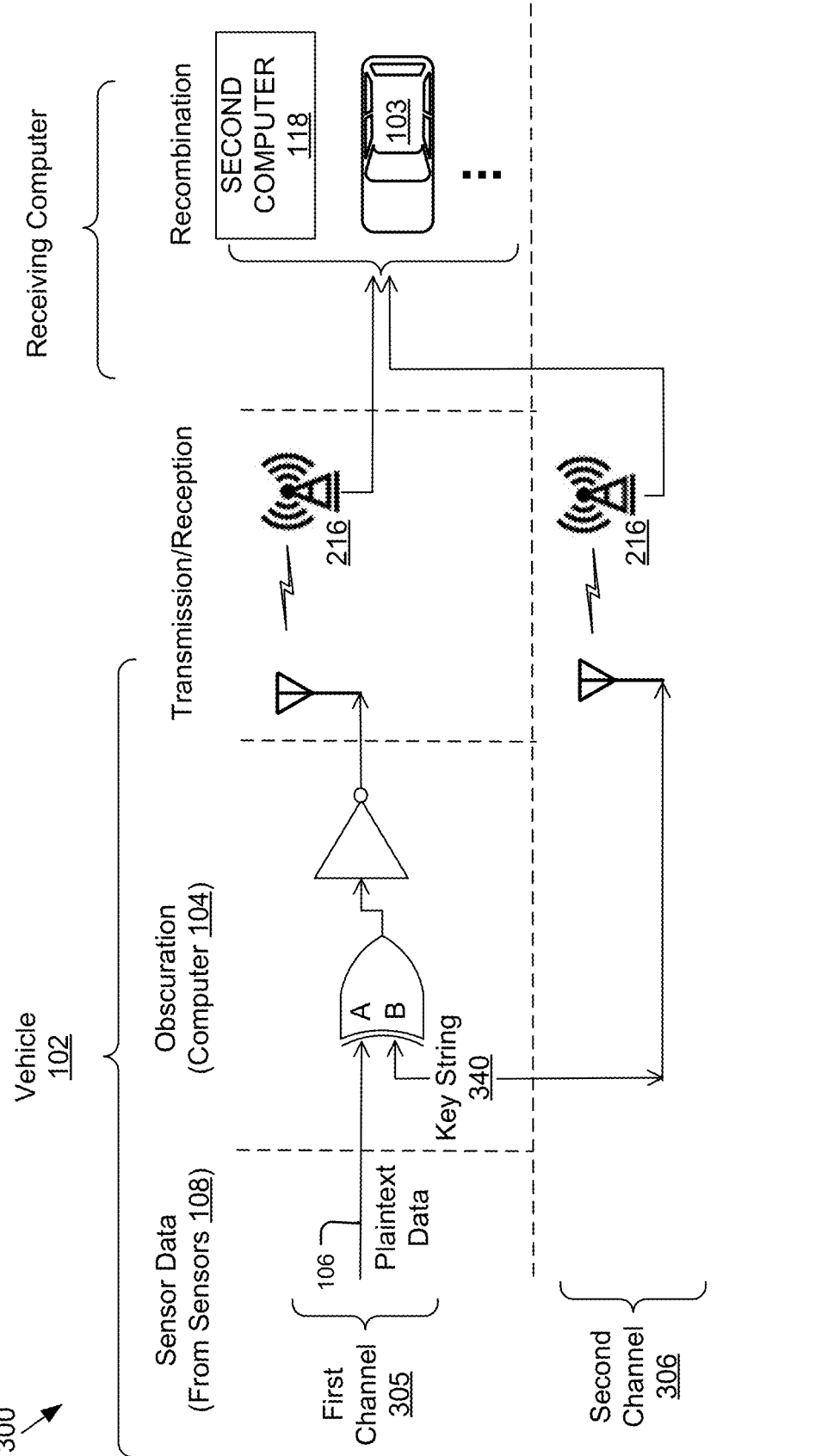
FIGS. 3-4 are diagrams of example systems for providing security of transmitted vehicle data.

FIG. 3 is a diagram of an example system 300 for providing security of transmitted vehicle data. As seen in FIG. 3, wireless communications between vehicle 102 and a receiving computer utilizes first channel 305 and second channel 306 in an operation to obscure data communicated between vehicle 102 and the receiving computer. In this context, a receiving computer can be any computer, such as second computer 118, e.g., located in the cloud, a computer of second vehicle 103, or any other type of computing entity that includes suitable programming to receive and "unobscure" data transmitted from vehicle 102. In this context, the receiving computer has access to first channel 305, so as to receive vehicle data, and has access to second channel 306, so as to receive key strings and any other keying parameters. Data can include any type of data that is sensed or observed by any one or more of sensors 108, which may include images captured by a camera onboard vehicle 102, a point cloud data originating from an onboard LIDAR, objects detected and/or classified by sensors 108, or any other type of transmitted by vehicle 102. In example embodiments, data transmitted via vehicle network 106 may comprise plaintext data, which, in this context, refers to data that has not been encrypted or obscured to preclude reception and/or interpretation by an unintended party.

As described herein, to maintain security of data, computer 104 may operate to obscure data prior to transmission utilizing communications component 114. To obscure data, computer 104 can apply one or more Boolean logic operators to plaintext data in parallel with applying a key string to the Boolean logic operators. In example embodiments, binary digits representing data may be applied to a first input port of one or more Boolean operators. Further, binary digits of a key string can be applied to a second input port of the one or more Boolean operators, typically in parallel with input of binary digits representing data. The data can then be transmitted wirelessly, via communications component 114, through a first communications channel, and the key string utilized to obscure the data can be transmitted through a second communications channel.

A receiving computer, such as second computer 118, or a computer onboard second vehicle 103, etc., can perform operations to generate key strings for input into the Boolean operators, utilizing, for example, any suitable randomization technique. A computer performing operations to obscure data as described herein may be referred to as an "obscuring computer." As described in reference to FIG. 4, an example obscuring computer 104 may include obscuration programming 404, which operates to control a number of Boolean operators that are to be utilized to obscure data, such as data originating from sensors 108. For example, an obscuring computer such as computer 104 can transmit data to a first input of a single Boolean OR operator coupled in series with a Boolean NOT operator while obscuration programming 404 generates and synchronously transmits a randomly-generated key string into a second input of the Boolean OR operator. Accordingly, for this example, transmitted data may appear to be randomized via application of the randomly-generated key to the Boolean OR operator. In another example, the obscuring computer 104 can transmit data to a first input of two or more Boolean OR operators coupled to a Boolean NOT operator, while obscuration programming 404 synchronously transmits, for example, a single 8-bit key string to a second input of the two or more Boolean OR operators. In this manner, data may be further obscured via the application of the data to successive Boolean OR and NOT operators. In example embodiments, the number and type of Boolean operators utilized for obscuring data may be selected under the control of obscuration programming 404.

As described above, obscured data may be transmitted to communications component 114 for transmission utilizing a first communications channel (i.e., first channel 305 of FIG. 3). Key strings as well as additional obscuration parameters may also be transmitted, via communications component 114, utilizing a second communications channel (i.e., second channel 306 of FIG. 3). In example embodiments, first channel 305 and second channel 306 can include separate wireless communications channels, such as first and second Wi-Fi channels. For example, communications component 114 of vehicle 102 may utilize differing media access control (MAC) addresses. Thus, in example embodiments, eavesdropping party 220, who may be capable of eavesdropping on only a single communications channel, would thus be unable to decipher transmitted data present on the communications channel. Advantageously, security of data transmitted utilizing the first communications channel can be maintained.

Obscured data from and key string(s) from vehicle 102 may be received at a transceiver, such as wireless access point 216. Received obscured data and a received key string can be transmitted through a wireless infrastructure to a receiving or "unobscuring computer" such as a computer in a vehicle 102, second vehicle 103, and/or second computer 118, etc. The receiving computer, e.g., a computer onboard second vehicle 103, second computer 118, etc., can then reverse the obscuration process, such as by applying logic functions implemented by an obscuring computer, e.g., a computer 104, in reverse order. In reversing the obscuration process utilized by an obscuring computer, the receiving computer may utilize pre-stored details of the obscuration process utilized by the obscuring computer and/or may obtain such details. As seen in FIG. 3, obscured data can be transmitted utilizing first channel 305, while parameters to unobscure transmitted data can be transmitted utilizing second channel 306, for receipt by the receiving computer. For example, in response to an obscuring computer 104 transmitting, via second channel 306, the type of Boolean operations applied to data transmitted via first channel 305, the order of such Boolean operations, the number of such operations, and parameters relating to the data frames of the data stream obscured by such Boolean operators, the receiving computer may recover obscured data transmitted from the obscuring computer. Thus, for example, in response to an obscuring computer such as a computer 104 of vehicle 102 applying a Boolean OR operator in series with a Boolean NOT operator, an unobscuring computer, such as second computer 118, or a computer onboard second vehicle 103, may apply incoming data to a Boolean NOT operator in series with a Boolean OR operator. In this arrangement at second computer 118, output signals from the Boolean NOT operator are coupled to the first input of a Boolean OR operator while a key string is input to the second input of the Boolean OR operator. In turn, utilizing a computer, such as a computer at a second vehicle 103 and/or second computer 118, an obscuration process similar to that described above can be applied so as to provide data transmitted by vehicle 102 to other vehicles, such as second vehicle 103.

As disclosed above, obscuration of data such as vehicle sensor data may be achieved utilizing Boolean operators, such as a Boolean exclusive OR operator arranged or coupled in series with a Boolean NOT operator. Obscuration of data may comprise a balanced process, i.e., balanced obscuration. In context of this document, "balanced" obscuration refers to a process in which information content of data words is preserved, i.e., without latching, when the data is subjected to successive Boolean operations. Balanced obscuration may be contrasted with unbalanced obscuration, which results in loss of data. An example of balanced obscuration is illustrated in Table 1A (below) and an example of recovery of balanced obscured data is provided in Table 1B. An example of unbalanced obscuration is provided in Table 2, which follows Table 1B.

TABLE 1A

| (Balanced Transmit Operation - Boolean NOR) | | | |
|---|---|---|---|
| Data Bit Value (A) | Key Bit Value (B) | OR Operator Output Signal Value | NOT Operator Output Signal Value |
| 0 | 0 | 0 | 1 |
| 0 | 1 | 1 | 0 |
| 1 | 0 | 1 | 0 |
| 1 | 1 | 0 | 1 |

As illustrated in Table 1A, above, in balanced obscuration, such as an operation utilizing a Boolean OR operator coupled in series with a Boolean NOT operator, to form a Boolean NOR operator, for all binary combinations of a binary data value from sensors 108, and a value of a portion of a key string as inputs to a Boolean OR operator, states of binary output data signals (e.g., 0s and 1s) occur in equal probabilities. Accordingly, for a portion of a data word comprising (0, 0, 1, 1), and a key portion (0, 1, 0, 1) states of binary output signals from an Boolean OR operation correspond to (0, 1, 1, 0), and a NOT operation then produces (1, 0, 0, 1). Thus, for the simple example shown in Table 1A, a binary output data signal of 0 occurs in 2 out of 4 instances in each output from a Boolean operation. Similarly, a binary output data signal of 1 also occurs in 2 out of 4 instances. Thus, as illustrated in Table 1A, a 4-bit portion of a data word of (0, 0, 1, 1) input to successive Boolean operators maps to, or results in output of, output signal values of (1, 0, 0, 1) without loss of data. This can be verified in Table 1B, which provides an example of a recovery process.

TABLE 1B

| (Receive Operation - Boolean NOR) | | | |
|---|---|---|---|
| Received Bit Value (From Table 1A) | NOT Operator Output Signal Value to OR Operator Port (A) | Key Bit Value to OR Operator Port (B) | OR Operator Output Signal Value |
| 1 | 0 | 0 | 0 |
| 0 | 1 | 1 | 0 |
| 0 | 1 | 0 | 1 |
| 1 | 0 | 1 | 1 |

As seen in Table 1B, at a receiving end, signal values of (1, 0, 0, 1), which correspond to the output signal values of the Boolean NOT operator of Table 1A, are operated upon via Boolean operators arranged in an order that is the reverse of the operations conducted at a transmitting end. In the example of Table 1B, received signal values of (1, 0, 0, 1) are input to a Boolean NOT operator, resulting in signal values of (0, 1, 1, 0). In turn, the output signals of the Boolean NOT operator (0, 1, 1, 0) are input to a first input port of a Boolean OR operator while bit values of a key string (0, 1, 0, 1) are input to a second port of the Boolean OR operator. In response to the Boolean OR operation, the output signal values of the Boolean OR operator correspond to (0, 0, 1, 1), which correspond to the data bit values shown in Table 1A. Accordingly, as shown in Tables 1A and 1B, values of the originally transmitted can be recovered.

In contrast to the balanced process of data obscuring in a transmission process, an example of an unbalanced operation is provided in Table 2 below.

TABLE 2

| (Unbalanced Operation - Boolean AND) | | |
|---|---|---|
| Data Value (A) | Key Value (B) | AND Operator Output Signal Value |
| 0 | 0 | 0 |
| 0 | 1 | 0 |
| 1 | 0 | 0 |
| 1 | 1 | 1 |

As illustrated in Table 2, above, in an unbalanced operation, such as an operation utilizing a Boolean AND, states of binary output data signals occur in unequal probabilities, i.e., an unequal number of times, in an output string. As illustrated, for a portion of a data word comprising (0, 0, 1, 1), and a key portion (0, 1, 0, 1) states of binary output signals correspond to (0, 0, 0, 1). Thus, for the example shown in Table 2, a binary output data signal of 0 occurs in 3 out of 4 instances, while a binary output data signal 1 occurs in 1 out of 4 instances. Accordingly, due to the unequal distribution of binary output signal states, use of the Boolean AND operator in a process of data obscured would result in loss of data.

As an extension of the example of Table 1A, in Table 3 (below) and 8-bit binary digital word representing data, again illustrates the balanced obscuration process brought about utilizing a Boolean OR operator arranged in series with a Boolean NOT operator.

TABLE 3

| Data Value (A) | Key Value (B) | OR Operator Output Signal Value | NOT Operator Output Signal Value |
|---|---|---|---|
| 1 | 1 | 0 | 1 |
| 1 | 0 | 1 | 0 |
| 0 | 0 | 0 | 1 |
| 0 | 1 | 1 | 0 |
| 1 | 1 | 0 | 1 |
| 0 | 1 | 1 | 0 |
| 0 | 0 | 0 | 1 |
| 1 | 0 | 1 | 0 |

Thus, as seen in the example of Table 3, an input data value present at a first port (A) of a Boolean OR operator of data word (1, 1, 0, 0, 1, 0, 0, 1), which may correspond to an 8-bit data word comprising data transmitted along vehicle network 106, can be obscured utilizing values of an 8-bit key string of (1, 0, 0, 1, 1, 1, 0, 0) coupled in parallel to a second port (B) of a Boolean OR operator coupled to an input of a Boolean NOT operator results in an output signal of (1, 0, 1, 0, 1, 0, 1, 0). Output signals corresponding to (1, 0, 1, 0, 1, 0, 1, 0) can then be received at the receiving end. Further, in accordance with the example of Table 1B, a reversal of the obscuration process will result in recovery of transmitted data.

Hence, by way of the balanced obscuration process described in relation to Table 3, an eavesdropping party who may attempt to monitor communications between vehicle 102 and wireless access point 216 would receive a data word that may appear as nonsensical information. It may additionally be seen from Table 3, that generating the obscured data, such as at the output of the Boolean NOT operator obscured by way of the process described in relation to Table 3, comprises changing a value of a portion of the obscured data, e.g., the binary 1 at the first position of the data word (1, 1, 0, 0, 1, 0, 0, 1), based on a relationship between the portion of the data word and a portion of the key string, such as the binary 1 at the first position of the key string (1, 0, 0, 1, 1, 1, 0, 0). It may further be seen from the example described in relation to Table 3 that generating obscured data comprises changing a value of a portion of a data word of a data stream can be based on whether the value of the portion of the data word is equal to a value at the corresponding location of key string 340. For example, as shown in Table 3, for binary digits of a data word having values equal to values at a corresponding position of a key string, such as positions 1, 3, 5, and 7 of Table 3, results in Boolean NOT operator output signal values of a binary 1. For binary digits of the data word having values unequal to values at a corresponding position of a key string, such as at positions 2, 4, 6, and 8 of Table 3, results in Boolean NOT operator output signal values of a binary 0.

It should be noted that although the data words and key strings described in relation to Table 3 refers to the use of 8-bit data words and 8-bit key strings, in other example embodiments, data words and key strings having other lengths may be utilized. For example, data words and key strings may comprise longer lengths, such as 16-bits, 32-bits, 64-bits, etc. In addition, as described in reference to FIG. 4, any number of successive combinations of Boolean OR operators and Boolean NOT operators may be utilized in a process of providing balanced obscuration of data. In other examples, such as that of FIG. 4, a number of successive combinations of Boolean OR operators and Boolean NOT operators may be dynamically selectable, e.g., by obscuration programming 404 executed by computer 104 of vehicle 102. Selection of a number of successive combinations of Boolean OR operators and Boolean NOT operators may be performed by obscuration programming 404 in accordance with executable instructions to facilitate a random number of successive Boolean OR and NOT operations. An example embodiments, selection of a dynamic and random number of successive Boolean OR and NOT operations may further enhance obscuration of data words.

Figure 4:
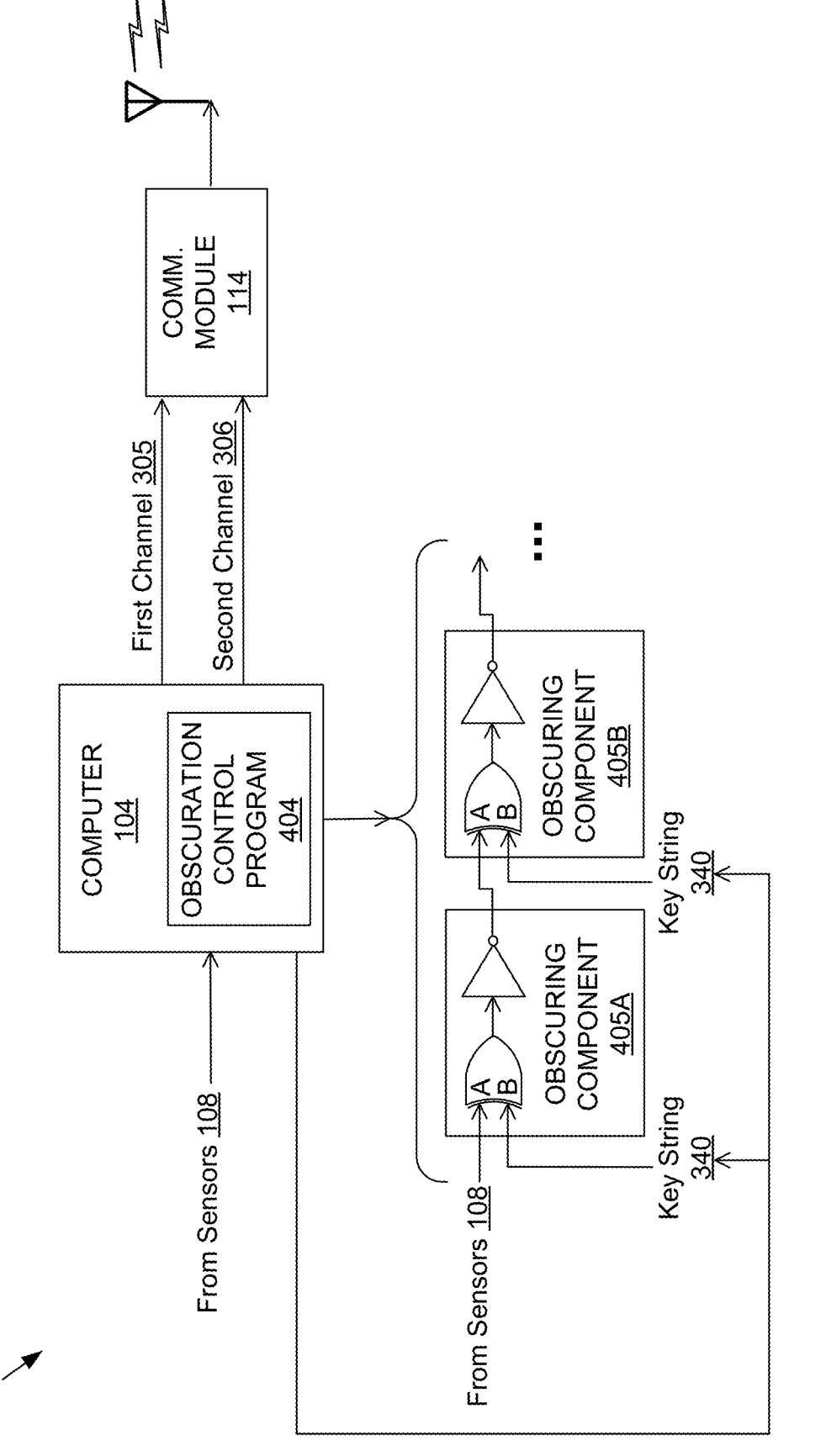

FIG. 4 is a diagram of another example system for providing security of transmitted vehicle data. In system 400, first obscuring component 405A, comprises a Boolean OR operator coupled serially to a Boolean NOT operator. Data words from sensors 108 are shown as being coupled to the first input port of a Boolean NOT operator while key string 340 is coupled to the second input port of the Boolean OR operator. Thus, a first layer of data obscuration may be achieved. Relative to FIG. 3, FIG. 4 additionally depicts a second obscuring component 405B, in which output signals from a Boolean NOT operator are coupled to a first input port of a Boolean OR operator while key string 340 is synchronously coupled to a second input port of the Boolean OR operator. Output signals from the Boolean OR operator of second obscuring component 405B are coupled to a second Boolean OR operator. In the example of FIG. 4, obscuration programming 404 may dynamically select whether one or both of obscuring components (405A, 405B) are to be utilized to obscure data transmitted from vehicle 102. In other examples, any number of additional obscuring components (405A, 405B) may be utilized.

Thus, it may be seen from FIG. 4 that any number of successive Boolean OR operators coupled serially to Boolean NOT operators by obscuration programming 404, which can be a set of programming instructions in an obscuring computer such as a vehicle computer 104, operate to include additional obscuring components similar to obscuring components 405A and 405B. As shown in FIG. 4, obscuring components 405A and 405B can comprise discrete logic modules or gates, each of which includes a Boolean OR operator in series with a Boolean NOT operator. Thus, under the control of obscuration programming 404 of computer 104, any number of obscuring components 405A, 405B can be included in the path data such as data originating from sensors 108. Accordingly, by including additional obscuring components 405A, 405B into the path of data from sensors 108 or the like, increasing layers of obscuration data may be achieved. Thus, for example, system 400 may include 5 obscuring components (405A, 405B), 10 obscuring components (405A, 405B), 20 obscuring components (405A, 405B), or any other number of successively coupled Boolean exclusive OR operators and Boolean NOT operators. In example embodiments, a number of successively coupled Boolean exclusive OR operators and Boolean NOT operators, such as arranged in obscuring components (405A, 405B) may be randomly and/or dynamically selected by obscuration programming 404 of computer 104. Thus, in an example, during a first duration and under the control of obscuration programming 404, data from sensors 108 may be obscured utilizing, for example, 10 obscuring components (405A, 405B) and during a second duration, data from sensors 108 may be obscured utilizing 15 obscuring components (405A, 405B). In example embodiments, obscuration programming 404 may operate to perform changes in the number of obscuring components (405A, 405B) utilized to obscure data from sensors 108 transmitted utilizing first channel 305 may be accompanied by, or preceded by, transmission of key string 340 utilizing second channel 306. Accordingly, at an external location, e.g., second computer 118 or any other receiving unobscuring computer, e.g., a computer of second vehicle 103, can decode data from sensors 108, thus providing an obscured communications channel between vehicle 102 and an unobscuring computer at a receiving end.

Figure 5:
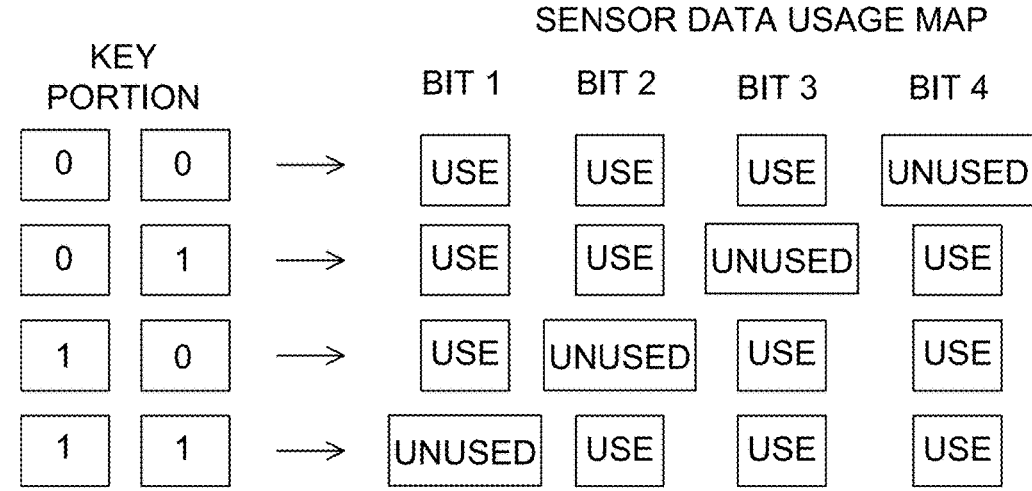
FIG. 5 is a diagram of an example technique for providing an additional layer of security to transmitted vehicle data.

FIG. 5 is a diagram of an example technique 500 for providing an additional layer of security to transmitted data. Example technique 500 could be applied prior to obscuration of data, such as described in reference to FIGS. 3 and 4, or could be applied after obscuration, such as prior to transmitting obscured data along first channel 305. In accordance with example technique 500, an obscuring computer such as a computer 104 of vehicle 102 may employ a rule for inserting an unused bit into a data stream, e.g., data words from sensor 108. For example, the rule may specify that, in response to a portion, e.g., 2 bits, of a key string comprising various combinations, data from sensors 108 may be interspersed with unused or "skipped" bits. Thus, for example, responsive to bit positions 1 and 2 of key string 340 comprising a value of (0, 0), respectively, the computer 104 may be directed to encode a data word in a manner that does not place meaningful data into bit position 4. Responsive to bit positions 1 and 2 of key string 340 comprising a value of (0, 1), respectively, computer 104 may be programmed to encode a data word in a manner that does not place meaningful data into bit position 3. Similarly, responsive to bit positions 1 and 2 of key string 340 comprising a value of (1, 0), bit position 2 of a data word does not contain meaningful data. Similarly, responsive to bit positions 1 and 2 of key string 340 comprising a value of (1, 1), bit position 1 of a data word does not contain meaningful data.

It should be noted that numerous variations and/or combinations of example technique 500 for providing an additional layer of security to transmitted vehicle data may utilize alternative mappings of unused bit positions and used bit positions in response to portions of key string 340. Thus, in an example embodiment, for a key string comprising 32 bits, any 5-bit portion of a key string may be utilized to indicate which bit of a 32-bit data word from vehicle 102 is to remain unused in a process of obscuring data from vehicle 102.

Figure 6:
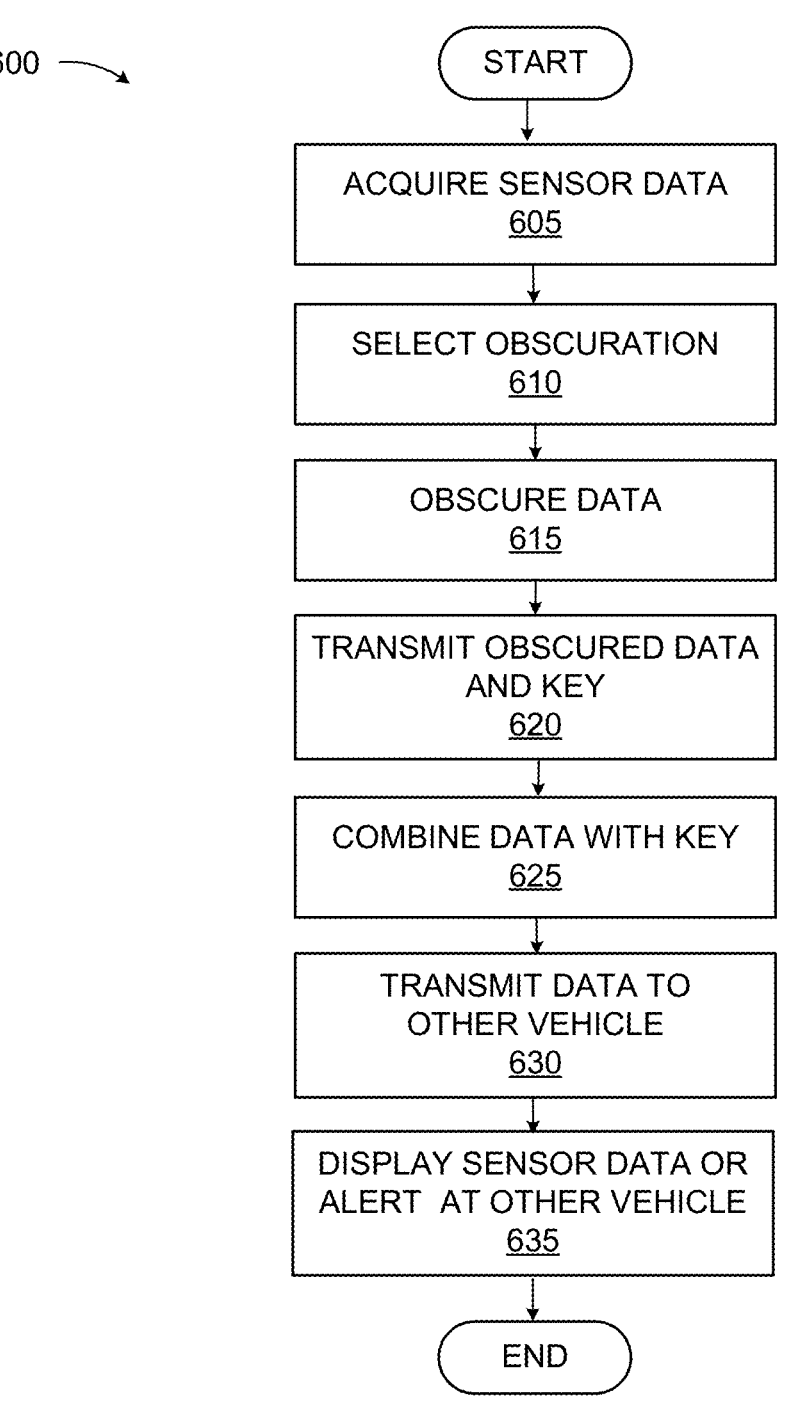
FIG. 6 is a process flow diagram of an example process for providing security of transmitted vehicle data.

FIG. 6 is a process flow diagram of an example process 600 for providing security of transmitted data. In example embodiments, the memory of computer 104 stores executable instructions for performing the steps of process 600, and/or such programming could be implemented in other computing devices, such as a second computer 118, some other non-vehicle computer, other computing devices of vehicle 102, and/or a computing device onboard vehicle 103. Further, the example process 600 can be utilized to provide data security in other applications for which first and second communications channels may be available. Thus, although the process 600 is described as a vehicle-based process, with an obscuring computer being a vehicle computer 104, and an unobscuring computer being second computer 118 and/or a computer in a second vehicle 103, it is to be understood that the process 600 could be applied in the context of any obscuring computer that receives data and communicates that data via a network to a second computer that can operate as an unobscuring computer as described herein.

As a general overview of a vehicle-based process 600, vehicle computer 104, or a computer utilized in any other communications application, can receive data. Sensor data, one example of data to which principles herein may be applied, may include data that classifies, or can be processed to classify, an object within the field-of-view of sensors 108, of vehicle 102. Vehicle 102 may initiate a process to cooperatively transmit parameters of the object to other vehicles operating in the local environment of vehicle 102 so as to provide the other vehicles with an awareness of an object that may be hidden or not yet visible to another vehicle. Vehicle 102 may operate in an environment within which a eavesdropping party 220, may attempt to insert erroneous, false, and/or misleading data into a wireless communications channel between vehicle 102 and a wireless transceiver, e.g., wireless access point 216. Thus, vehicle 102 may initiate a process to obscure transmitted data, so as to preclude an eavesdropping party from monitoring, inserting data into, data transmissions transmitted via a first communications channel.

Process 600 begins at block 605, at which computer 104 acquires data, e.g., from one or more sensors of vehicle 102. For example, the data could be used to detect and/or classify an object indicated by the data object. As mentioned above, principles and steps of the process 600 could be applied to other kinds of data and/or in other systems or architectures, e.g., a property monitoring system that transmits data from one computer to another.

Process 600 may continue at block 610, which can include computer 104 selecting to obscure transmitted data to provide security to the data to be transmitted from vehicle 102. In example embodiments, selection of obscuration parameters can include computer 104 randomly selecting a number of successive Boolean NOT operators and Boolean OR operators to be applied to data from sensors 108, as described in reference to FIGS. 3 and 4 herein. For example, computer 104 may randomly select to apply 10 successive Boolean NOT operators coupled to Boolean OR operators, such as described in reference to FIG. 4. Obscuration programming 404, e.g., programming for carrying obscuration processes as described in reference to FIG. 4, of computer 104 can additionally select or form a key string also described in reference to FIGS. 3 and 4.

Process 600 may continue at block 615, at which a selected key string may be applied to data originating from sensors 108 to obscure data. Block 615 can include binary digits of individual data words being applied to a first input port of an exclusive Boolean OR operator while binary digits of a key string are applied to a second input port of the exclusive Boolean OR operator. Block 615 may additionally include resulting output signals of the exclusive Boolean OR operator being applied to an input port of a Boolean NOT operator as described in reference to FIGS. 3 and 4. In example embodiments, Boolean NOT operators and Boolean OR operators may be arranged into obscuring components (405A, 405B), which may be serially coupled, so as to provide multiple layers of obscuration, in which key string 340 is applied in parallel to input ports of the selected randomly-generated number of Boolean NOT operators.

Process 600 may continue at block 620, at which obscured data can be transmitted utilizing first channel 305 to the receiving computer, e.g., second computer 118. Transmission of obscured data may be preceded by, accompanied by, or followed by transmission of key string 340 utilizing second channel 306 to the receiving computer. In addition to key strings transmitted via second channel 306, transmission may also include other parameters, such as a number of obscuration components (405A, 405B) utilized to obscure sensor data, parameters relating to the data frames of a data stream via first channel 305, etc. Communications channels 305 and 306 can comprise separate wireless communications channels, such as Wi-Fi channels having separate MAC addresses.

Process 600 may continue at block 625, at which second computer 118 can operate to reverse an obscuration process previously applied to data received by way of first channel 305 with a key string received by way of second channel 306. Block 625 may be performed in a V2I environment in which second computer 118 implements a process that is the reverse of the Boolean operations performed to obscure data from sensors 108. For example, in response to sensor data being obscured at computer 104 utilizing a Boolean OR operator coupled to a Boolean NOT operator, second computer 118 may return obscured data to plaintext data utilizing a Boolean NOT operator coupled to a first input port of a Boolean OR operator having a second input port to receive key string 340. In another example, block 625 may be performed at second vehicle 103 having a computer capable of implementing a process that is the opposite of the Boolean operations performed to obscure data from sensors 108 of vehicle 102.

Process 600 may continue at block 630, which, for example, in a V2I environment, may include second computer 118 transmitting obscured data to second vehicle 103. In such an example, in response to second computer 118 transmitting the type of Boolean operations applied to transmitted data, the order of such Boolean operations, the number of such operations, and parameters relating to the data frames of the data stream obscured by such Boolean operators, second vehicle 103 may recover, i.e., unobscured, obscured data transmitted from vehicle 102. In an example, data transmitted second vehicle 103 from the computer 104 may utilize a first communications channel to transmit obscured data and a second communications channel to transmit key string(s) and/or other keying parameters such as a number of obscuration components used to obscure data transmitted via the first communications channel. A receiving computer, e.g., in second vehicle 103, can then reverse the obscuration process, such as by applying logic functions implemented by obscuration programming 404 of computer 104 in the reverse order.

Process 600 may continue at block 635, which can include display of data originating from vehicle 102 at a second other vehicle, such as vehicle 103. Alternatively, or in addition, second vehicle 103 may display a message based on detection by vehicle 102 of an object that may come into the path, e.g., path 252, of vehicle 103.

After block 635, process 600 ends.

In an example, the process 600 may be utilized in a V2V environment, in which vehicle 102 communicates directly with second vehicle 103. For example, responsive to vehicle 102 transmitting obscured data via a first channel and transmitting a key string and other parameters via a second channel, at block 620, the process may proceed directly to block 625, at which second vehicle 103 may perform operations to reverse an obscuration process. The process may then proceed to 635, which can include display of data originating from vehicle 102 at second vehicle 103.

Figure 7:
FIG. 7 is a diagram of an example technique for providing security of transmitted vehicle data via virtual channels.

FIG. 7 is a diagram 700 of an example technique for providing security of transmitted vehicle data via virtual channels that utilize a single, physical communications channel 305. In FIG. 7, vehicle data and a key string are combined into a single communications channel, i.e., first channel 305. First channel 305 may include vehicle data that has been interwoven with a key string at a portion of the first data frame. Key string 340 may be accompanied by parameters such as the type of Boolean operations applied to transmitted data, the order of such Boolean operations, the number of such operations, and parameters relating to the data frames of the data stream obscured by Boolean operators to obscure vehicle data. Thus, as seen in FIG. 7, beginning at time $T_1$, key string 340 and accompanying parameters may be transmitted at a first portion of a data frame, and data may be transmitted during the remaining portion of the data frame. At a subsequent data frame, transmitted at time $T_2$, key string 340 may be transmitted during a third portion of the data frame, and vehicle data may be transmitted during first and second portions of the data frame. Beginning at a third portion of the data frame, transmission of vehicle data may take place.

Thus, as seen in FIG. 7, which may be utilized in environments in which, for example, a second Wi-Fi channel is not available, advantages of transmitting data and key strings utilizing separate channels may nonetheless be realized.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
a computer including a processor coupled to a memory, the memory storing instructions including instructions executable by the processor to:
generate obscured data from data received from a vehicle sensor by applying a plurality of Boolean operations to the received vehicle sensor data according to a balanced obscuration process that preserves information content of data words of the received vehicle sensor data responsive to successive ones of the Boolean operations that utilize the data words and a key as inputs to the successive Boolean operations;
transmit, via a first communications channel, the obscured received data to a second computer;
transmit, via a second communications channel, the key to the second computer with values to reverse obscuration of the obscured received data; and
display the received vehicle sensor data at a second vehicle.

2. The system of claim 1, further comprising the second computer that includes a second processor coupled to a second memory, the second memory storing second instructions including instructions executable by the second processor to apply a Boolean operation to the key and the obscured received data to reverse obscuration of the obscured received data.

3. The system of claim 1, wherein the instructions further include instructions to:
insert an unused bit into the obscured received data after generating the obscured received data.

4. The system of claim 1, wherein the instructions further include instructions to:
insert an unused bit into a data word of the obscured received data according to a rule to indicate the position of the unused bit of the data word.

5. The system of claim 1, wherein the instructions to generate the obscured received data include instructions to change a value of a portion of the obscured received data based on a relationship between the portion and a portion of the key.

6. The system of claim 1, wherein the instructions to generate the obscured received data include instructions to change a value of a portion of a data word of the obscured received data based on a relationship between the value of the portion of the obscured received data word and the value of a corresponding portion of the key.

7. The system of claim 1, wherein the instructions to generate the obscured received data include instructions to change a value of a portion of a data word based on whether the value of the portion of the data word is equal to a value at the corresponding location of the key.

8. The system of claim 1, wherein the instructions to generate the obscured received data include instructions to apply an exclusive Boolean OR operator to the received vehicle sensor data.

9. The system of claim 1, wherein the instructions to generate the obscured received data include instructions to apply a Boolean NOT operator to the received vehicle sensor data.

10. The system of claim 1, wherein the instructions to generate the obscured received sensor data include instructions to apply a dynamically selectable number of successive exclusive Boolean OR operations to the received vehicle sensor data.

11. The system of claim 1, wherein the instructions to generate the obscured received data include instructions to apply a dynamically selectable number of successive exclusive OR operators and a dynamically selectable number of successive NOT operators to the received vehicle sensor data.

12. The system of claim 1, wherein the instructions to generate the obscured received data include instructions to apply a dynamically selectable random number of exclusive OR operators and a dynamically selectable random number of NOT operators to the received vehicle sensor data.

13. The system of claim 1, wherein the first communications channel and the second communications channel include wireless channels having addresses that differ from each other.

14. The system of claim 1, wherein the received vehicle sensor data is from a vehicle sensor of a first vehicle, the vehicle sensor having a field of view of an area external to the first vehicle and hidden from a sensor of the second vehicle.

15. A method comprising:
generating obscured data from data received from a vehicle sensor by applying at least one Boolean operation to the received vehicle sensor data according to a balanced obscuration process that preserves information content of data words of the received vehicle sensor data responsive to successive ones of the Boolean operations that utilize the data words and a key as inputs to the successive Boolean operations;
transmitting, via a first communications channel, the obscured received data to a second computer;
transmitting, via a second communications channel, the key to the second computer with values to reverse obscuration of the obscured received data; and
displaying the received vehicle sensor data at a second vehicle.

16. The method of claim 15, further comprising:

inserting an unused bit into a data word of the obscured received data after generating the obscured received data according to a rule to indicate the position of the unused bit.

17. The method of claim 15, further comprising:

changing a value of a portion of a data word of the obscured received data based on whether the value of the portion of the data word is equal to a value at the corresponding location of the key.

18. The method of claim 15, wherein generating the obscured received data comprises:

applying, under direction of a computer, a dynamically selectable number of successive exclusive Boolean OR operators to the received vehicle sensor data.

19. The method of claim 15, wherein generating obscured received data comprises:

applying a dynamically selectable random number of successive exclusive OR operators and a dynamically selectable random number of successive NOT operators to the received vehicle sensor data.

20. The method of claim 15, wherein the received vehicle sensor data is from a vehicle sensor of a first vehicle, the vehicle sensor having a field of view of an area external to the first vehicle and hidden from a sensor of the second vehicle.

* * * * *